United States Patent
Yang et al.

(10) Patent No.: US 11,729,634 B2
(45) Date of Patent: *Aug. 15, 2023

(54) METHOD AND DEVICE FOR TRANSMITTING OR RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,044

(22) Filed: Oct. 6, 2022

(65) Prior Publication Data
US 2023/0049814 A1 Feb. 16, 2023

Related U.S. Application Data

(63) Continuation of application No. 17/306,151, filed on May 3, 2021, now Pat. No. 11,528,618, which is a
(Continued)

(51) Int. Cl.
*H04W 16/28* (2009.01)
*H04W 72/0446* (2023.01)

(52) U.S. Cl.
CPC ....... *H04W 16/28* (2013.01); *H04W 72/0446* (2013.01)

(58) Field of Classification Search
CPC .......................... H04W 16/28; H04W 72/0446
See application file for complete search history.

(56) References Cited

U.S. PATENT DOCUMENTS 10,999,745 B2   5/2021 Yang et al.
11,528,618 B2 * 12/2022 Yang ................. H04W 72/0446
(Continued)

FOREIGN PATENT DOCUMENTS

WO   WO-2015142045 A1 * 9/2015 ........... H04L 5/0035

OTHER PUBLICATIONS

LG Electronics, "Discussion on UL beam management," 3GPP TSG-RAN WG1 #87, R1-1611818, Nov. 2016, 4 pages.
(Continued)

*Primary Examiner* — Ivan O Latorre
(74) *Attorney, Agent, or Firm* — Lee Hong Degerman Kang Waimey

(57) ABSTRACT

The present invention relates to a wireless communication system and, more particularly, to a method and a device therefor, the method comprising the steps of: receiving scheduling information relating to uplink data; and transmitting the uplink data through a time slot having a plurality of symbols by using the scheduling information, wherein: when a reference signal for beam-arrangement is not transmitted in the time slot, a transmission beam direction of the uplink data remains the same in the time slot; and when the reference signal for beam-arrangement is transmitted in the time slot, the transmission beam direction of the uplink data is changed according to a transmission beam direction of the reference signal for beam-arrangement, in a symbol at which the reference signal for the beam-arrangement is transmitted in the time slot.

10 Claims, 13 Drawing Sheets

Related U.S. Application Data continuation of application No. 16/476,516, filed as application No. PCT/KR2018/000337 on Jan. 8, 2018, now Pat. No. 10,999,745.

(60) Provisional application No. 62/443,620, filed on Jan. 6, 2017.

(56) References Cited

U.S. PATENT DOCUMENTS

| | | |
|---|---|---|
| 2013/0017836 A1 | 1/2013 | Chang et al. |
| 2013/0142156 A1 | 6/2013 | Mazzarese et al. |
| 2015/0312864 A1 | 10/2015 | Jung |
| 2015/0312927 A1 | 10/2015 | Ko et al. |
| 2017/0019913 A1* | 1/2017 | Ahn .................. H04W 28/0205 |
| 2017/0202014 A1 | 7/2017 | Moon et al. |
| 2017/0207843 A1 | 7/2017 | Jung et al. |
| 2017/0208494 A1 | 7/2017 | Moon et al. |
| 2017/0359826 A1 | 12/2017 | Islam et al. |
| 2017/0373731 A1 | 12/2017 | Guo et al. |
| 2018/0006770 A1 | 1/2018 | Guo et al. |
| 2018/0199328 A1 | 7/2018 | Sang et al. |
| 2018/0310283 A1 | 10/2018 | Deenoo et al. |
| 2018/0337757 A1 | 11/2018 | Noh et al. |
| 2019/0190582 A1* | 6/2019 | Guo .................... H04L 25/0226 |
| 2020/0037273 A1 | 1/2020 | Yokomakura et al. |
| 2020/0305129 A1 | 9/2020 | Lee et al. |
| 2021/0266760 A1 | 8/2021 | Yang et al. |

OTHER PUBLICATIONS

European Patent Office Application Serial No. 18736138.1, Search Report dated Aug. 10, 2020, 9 pages.
PCT International Application No. PCT/KR2018/000337, Written Opinion of the International Searching Authority dated Apr. 12, 2018, 16 pages.
LG Electronics, "Considerations on NR SRS design", 3GPP TSG RAN WG1 Meeting #87, R1-1611808, Nov. 2016, 6 pages.
Catt, "Beamforming for data and control channel", 3GPP TSG RAN WG1 Meeting #87, R1-1611386, Nov. 2016, 4 pages.
Samung, "UL beam management RS", 3GPP TSG RAN WG1 Meeting #87, R1-1612496, Nov. 2016, 5 pages.
Intel, "On Uplink Beam Management", 3GPP TSG RAN WG1 Meeting #86bis, R1-1611987, Nov. 2016, 5 pages.
LG Electronics, "Considerations on NR CSI-RS design," 3GPP TSG-RAN WG1 Meeting #87, R1-1611807, XP51175776, Nov. 2016, 5 pages.
Huawei, HiSilicon, "DL RS design for NR CSI acquisition and beam management," 3GPP TSG-RAN WG1 #86bis, R1-1608817, XP51148871 Oct. 2016, 7 pages.
European Patent Office Application Serial No. 21209379.3, Extended Search Report dated Mar. 10, 2022, 9 pages.
United States Patent and Trademark Office U.S. Appl. No. 17/306,151, Notice of Allowance dated Jul. 7, 2022, 14 pages.
European Patent Office Application Serial No. 18736138.1, Notice of Allowance dated Jun. 18, 2021, 59 pages.
Nokia et al., "Beam Recovery In NR," 3GPP TSG-RAN WG2 Meeting #96, R2-167713, Nov. 2016, 4 pages.
United States Patent and Trademark Office U.S. Appl. No. 16/476,516, Office Action dated Aug. 21, 2020, 12 pages.
Ericsson, "Beam management overview," 3GPP TSG-RAN WG1 #87, R1-1612345, Nov. 2016, 5 pages.
NTT Docomo, "Reference Signal Design for NR Beam Management," 3GPP TSG-RAN WG1 #87, R1-1612727, Oct. 2016, 5 pages.
Korean Intellectual Property Office Application Serial No. 10-2019-7022250, Notice of Allowance dated Oct. 21, 2022, 3 pages.

* cited by examiner

[p] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

PUCCH format 1a and 1b structure (normal CP case)

METHOD AND DEVICE FOR TRANSMITTING OR RECEIVING WIRELESS SIGNAL IN WIRELESS COMMUNICATION SYSTEM

CROSS-REFERENCE TO RELATED APPLICATIONS

This application is a continuation of U.S. patent application Ser. No. 17/306,151, filed on May 3, 2021, which is a continuation of U.S. patent application Ser. No. 16/476,516, filed on Jul. 8, 2019, now U.S. Pat. No. 10,999,745, which is the National Stage filing under 35 U.S.C. 371 of International Application No. PCT/KR2018/000337, filed on Jan. 8, 2018, which claims the benefit of U.S. Provisional Application No. 62/443,620, filed on Jan. 6, 2017, the contents of which are all hereby incorporated by reference herein their entirety.

TECHNICAL FIELD

The present disclosure relates to a wireless communication system, and more particularly, to a method and device for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An aspect of the present disclosure devised to solve the conventional problem is to provide a method of efficiently transmitting/receiving a wireless signal in a wireless communication and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting an uplink signal by a user equipment (UE) in a wireless communication system includes receiving scheduling information for uplink data, and transmitting the uplink data in a time slot including a plurality of symbols based on the scheduling information. If a reference signal (RS) for beam alignment is not transmitted in the time slot, a transmission beam direction of the uplink data is maintained the same in the time slot, and if the RS for beam alignment is transmitted in the time slot, the transmission beam direction of the uplink data is changed to match a transmission beam direction of the RS for beam alignment in a symbol carrying the RS for beam alignment in the time slot.

In another aspect of the present disclosure, a UE used in a wireless communication system includes a radio frequency (RF) module and a processor. The processor is configured to receive scheduling information for uplink data, and to transmit the uplink data in a time slot including a plurality of symbols based on the scheduling information. If an RS for beam alignment is not transmitted in the time slot, a transmission beam direction of the uplink data is maintained the same in the time slot, and if the RS for beam alignment is transmitted in the time slot, the transmission beam direction of the uplink data is changed to match a transmission beam direction of the RS for beam alignment in a symbol carrying the RS for beam alignment in the time slot.

An original transmission beam direction configured for the uplink data may be different from the transmission beam direction of the RS for beam alignment.

If the transmission beam direction of the uplink data is changed to match the transmission beam direction of the RS for beam alignment, an RS for demodulation of the uplink data may additionally be transmitted in one or more symbols carrying the RS for beam alignment.

The transmission beam direction of the RS for beam alignment may be changed on a symbol group basis in the time slot, and the transmission beam direction of the uplink data may also be changed on a symbol group basis to match the transmission beam direction of the RS for beam alignment.

The wireless communication system may include a $3^{rd}$ generation partnership project (3GPP)-based wireless communication system.

Advantageous Effects

According to the present disclosure wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the disclosure and together with the description serve to explain the principle of the disclosure. The technical features of the present disclosure are not limited to specific drawings and the features shown in the drawings are combined to construct a new embodiment. Reference numerals of the drawings mean structural elements.

BEST MODE FOR CARRYING OUT THE DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
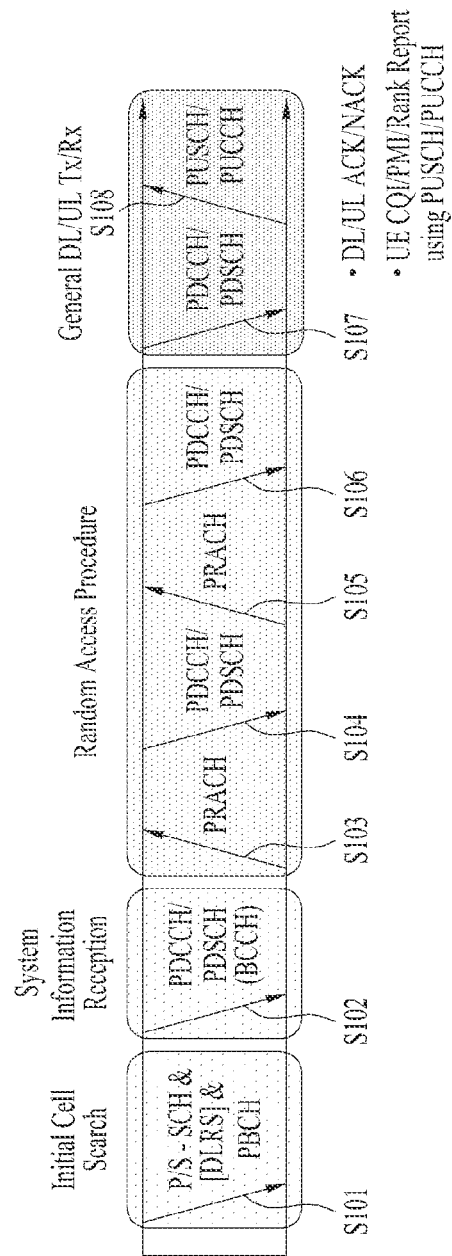
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
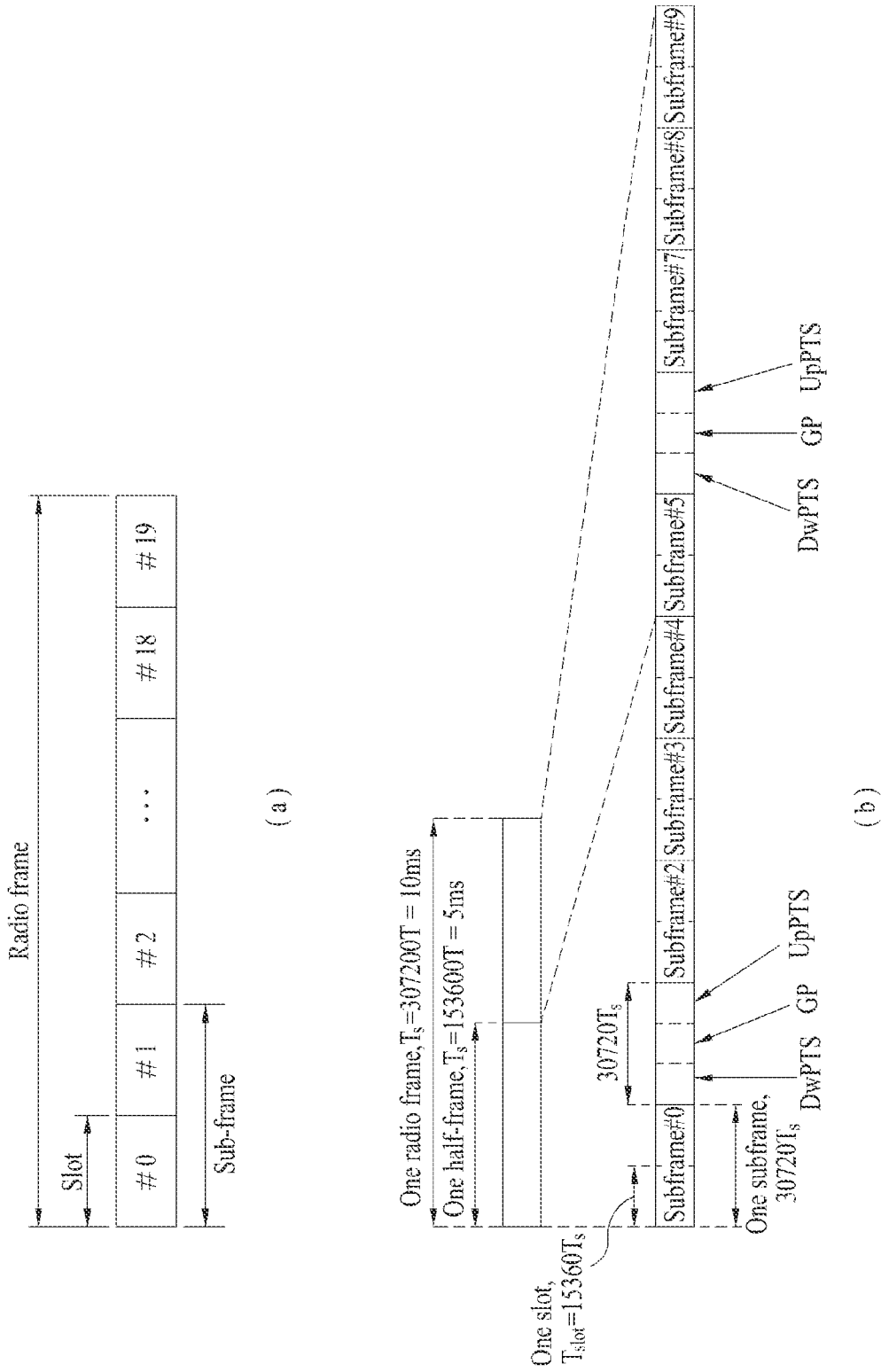
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
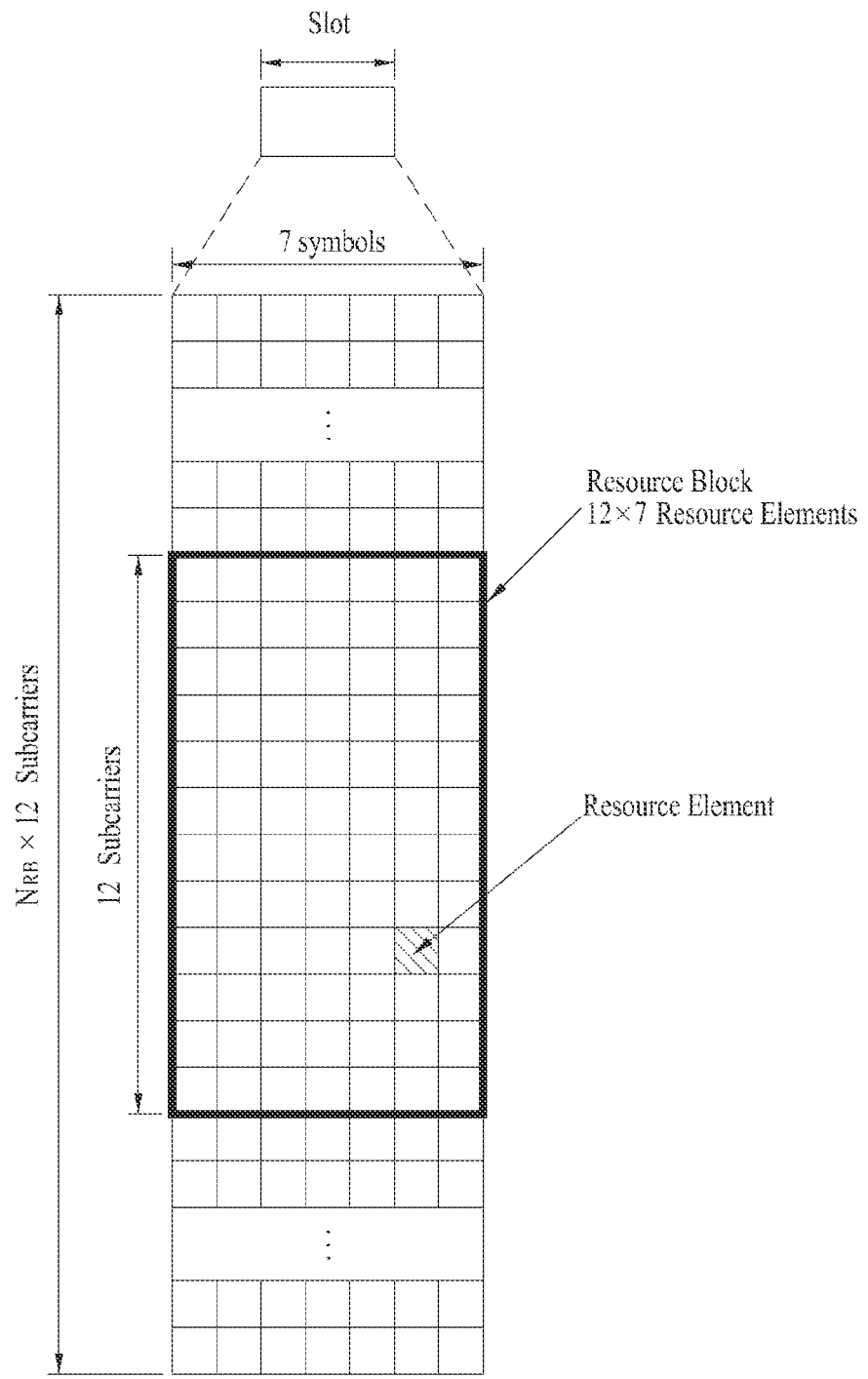
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
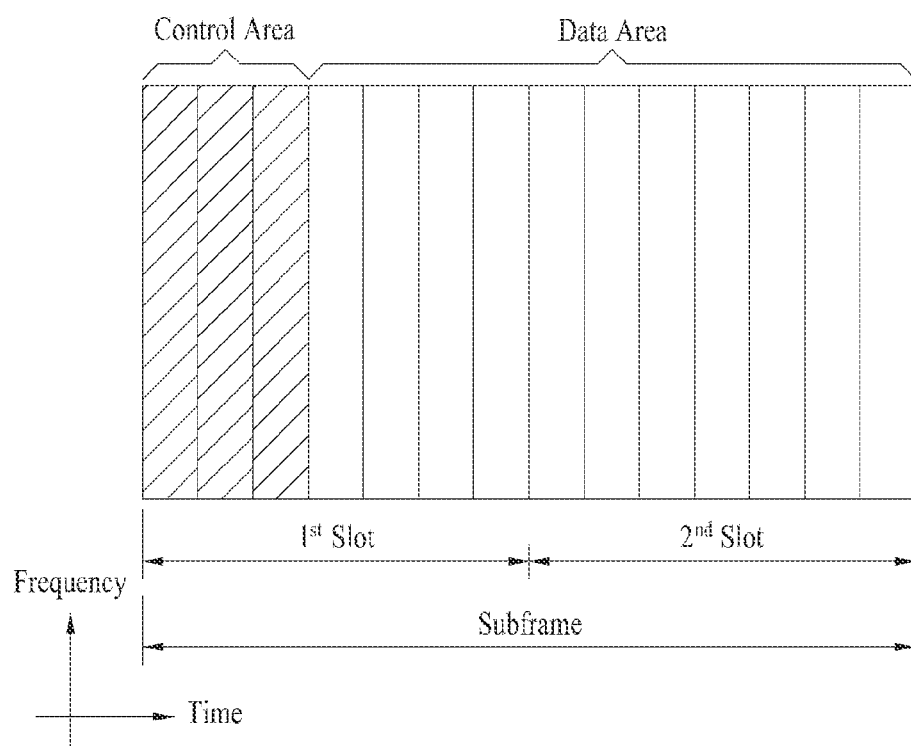
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
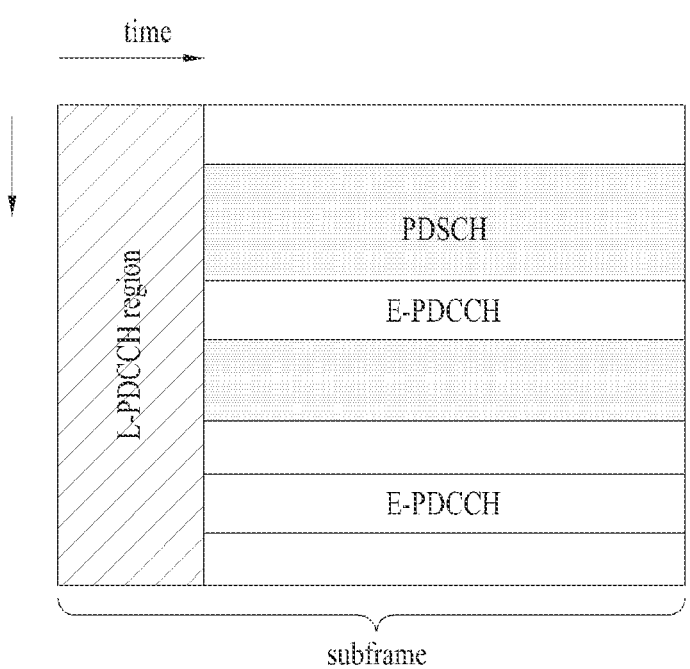
FIG. 5 illustrates an example of an Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (ports) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
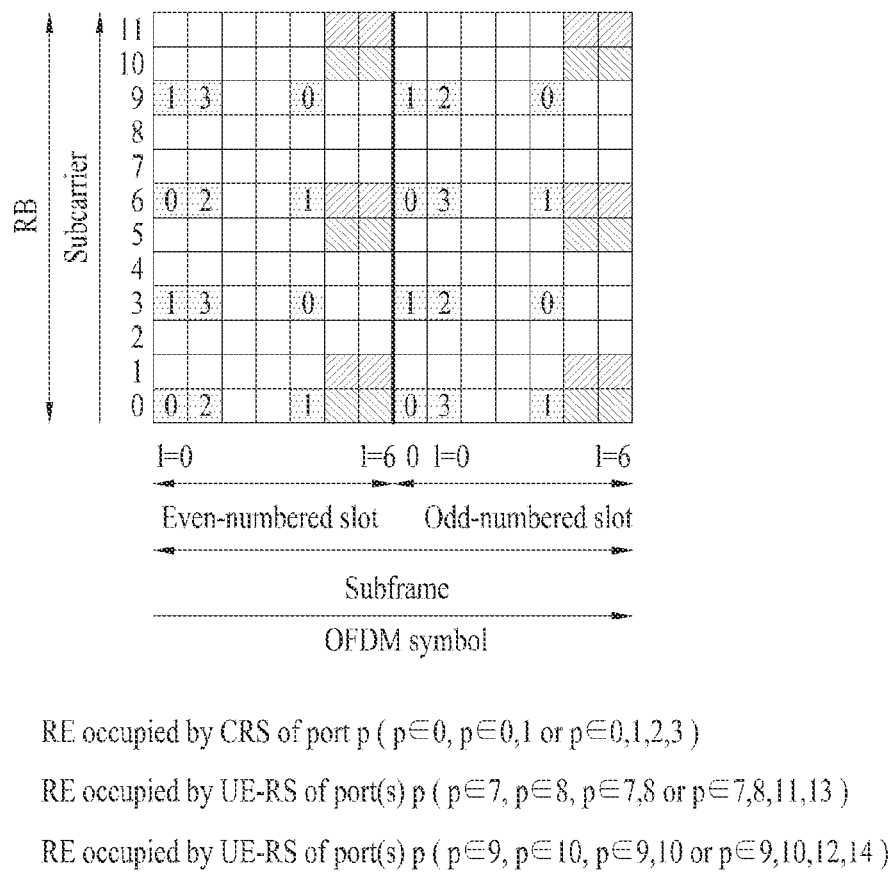
FIG. 6 illustrates configuration of cell specific reference signals (CRSs) and user specific reference signals (UE-RS).

FIG. 6 illustrates configuration of cell specific reference signals (CRSs) and user specific reference signals (UE-RS). In particular, FIG. 6 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at a BS.

Referring to FIG. 6, the CRS is transmitted through antenna ports p=0, p=0,1, p=0,1,2,3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the BS transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the BS should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 6, UE-RSs are transmitted on antenna port(s) p=5, p=7, p=8 or p=7,8, . . . , v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present.

Figure 7:
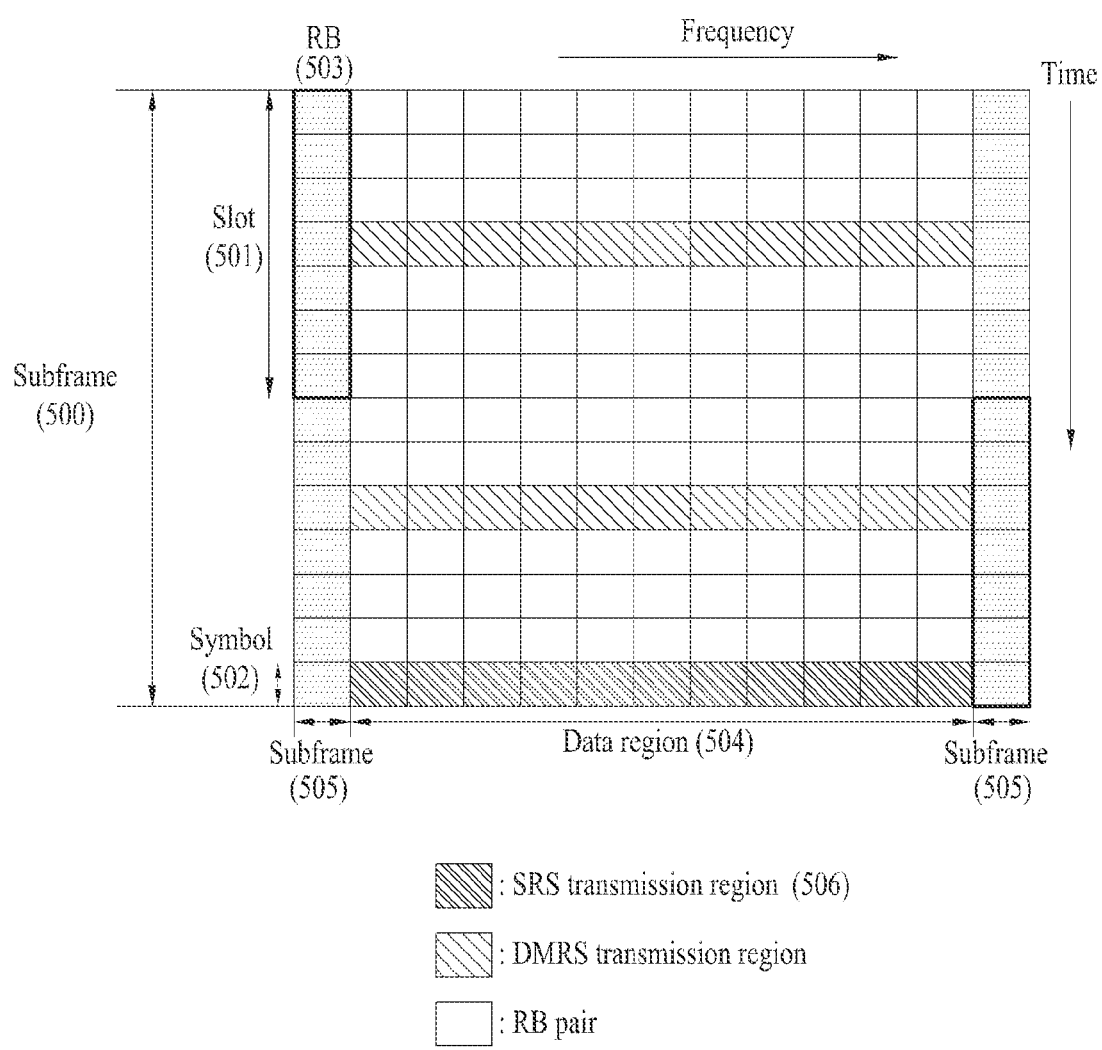
FIG. 7 illustrates the structure of an uplink subframe used in LTE(-A).

FIG. 7 illustrates a structure of an uplink subframe used in LTE(-A).

Referring to FIG. 7, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

The SRS includes constant amplitude zero auto correlation (CAZAC) sequences. SRSs transmitted from several UEs are CAZAC sequences $r^{SRS}(n)=r_{u,v}^{(\alpha)}(n)$ having different cyclic shift values a according to Equation 1.

$$\alpha = 2\pi \frac{n_{SRS}^{cs}}{8}, \qquad \text{[Equation 1]}$$

where $n_{SRS}^{cs}$ is a value set to each UE by a higher layer and has an integer value between 0 and 7.

CAZAC sequences generated from one CAZAC sequence through cyclic shift have zero-correlation values with sequences having different cyclic shift values. Using such property, SRSs of the same frequency domain may be divided in accordance with CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

In order to satisfy a transmission power $P_{SRS}$ of a UE, an SRS sequence $r^{SRS}(n)$ is first multiplied by an amplitude scaling factor $\beta_{SRS}$ and then mapped into a resource element (RE) having an index (k, l) from (0) by the following Equation 2.

$$a_{2k+k_0, l} = \begin{cases} \beta_{SRS} r^{SRS}(k) & k = 0, 1, \ldots, M_{sc,b}^{RS} - 1 \\ 0 & \text{otherwise} \end{cases}, \qquad \text{[Equation 2]}$$

where $k_0$ denotes a frequency domain start point of the SRS, and $M^{RS}_{sc,b}$ is a length (that is, bandwidth) of a sounding reference signal sequence expressed by a subcarrier unit defined in the following Equation 3.

$$M_{sc,b}^{RS} = m_{SRS,b} N_{sc}^{RB}/2 \qquad \text{[Equation 3]}$$

In the Equation 3, $m_{SRS,b}$ denotes an uplink bandwidth $N^{UL}_{RB}$ signaled from the eNB.

Figure 8:
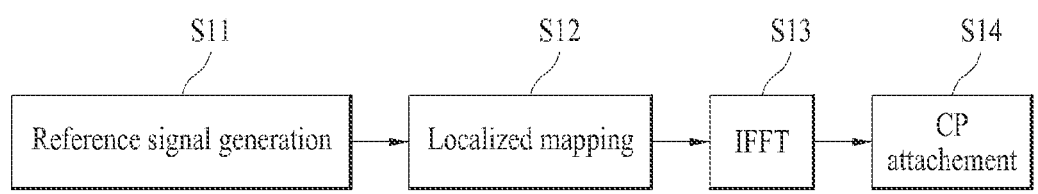
FIG. 8 illustrates a signal processing procedure for transmitting a reference signal (RS) to an uplink.

FIG. 8 illustrates a signal processing procedure for transmitting a reference signal (RS) to an uplink. Data is converted into a frequency-domain signal through a DFT precoder and then transmitted through IFFT after frequency mapping. On the other hand, an RS is transmitted without passing through the DFT precoder. Specifically, after an RS sequence is directly generated (S11) in the frequency domain, the RS is transmitted through sequential processes of localized mapping (S12), IFFT (S13), and cyclic prefix (CP) attachment (S14).

RS sequence $r_{u,v}^{(\alpha)}(n)$ is defined by a cyclic shift a of a base sequence, and may be expressed as the following Equation 4.

$$r_{u,v}^{(\alpha)}(n) = e^{j\alpha n}\bar{r}_{u,v}(n), 0 \le n < M_{sc}^{RS},$$ [Equation 4]

where $M_{sc}^{RS}=mN_{sc}^{RB}$ is a length of the RS sequence, $N_{sc}^{RB}$ is a resource block size expressed in a unit of subcarrier, and m is $1 \le m \le N_{RB}^{max,UL}$. $N_{RB}^{max,UL}$ denotes a maximum uplink transmission band.

Base sequences $\bar{r}_{u,v}(n)$ are divided into groups. $u \in \{0,1, \ldots, 29\}$ denotes a group number, and V corresponds to a base sequence number within the corresponding group. Each group includes one base sequence (v=0) of length $M_{sc}^{RS}=MN_{sc}^{RB}$ ($1 \le m \le 5$) and two base sequences (v=0,1) of each length $M_{sc}^{RS}=MN_{sc}^{RB}$ ($6 \le m \le N_{RB}^{max,UL}$). Each of the sequence group number u and the corresponding number v within the corresponding group may vary depending on time. The definition of the base sequence $\bar{r}_{u,v}(0), \ldots, \bar{r}_{u,v}(M_{sc}^{RS}-1)$ depends on the sequence length $M_{sc}^{RS}$.

Base sequences of length $3N_{sc}^{RB}$ or more may be defined as follows.

For $M_{sc}^{RB} \ge 3N_{sc}^{RB}$, the base sequence $\bar{r}_{u,v}(0), \ldots, \bar{r}_{u,v}(M_{sc}^{RS}-1)$ is given by the following Equation 5.

$$\bar{r}_{u,v}(n) = x_q(n \mod N_{ZC}^{RS}), 0 \le n < M_{sc}^{RS},$$ [Equation 5]

where a qth root Zadoff-Chu sequence may be defined by the following Equation $$x_q(m) = e^{-j\frac{\pi q m(m+1)}{N_{ZC}^{RS}}}, 0 \le m \le N_{ZC}^{RS}-1,$$ [Equation 6]

where q satisfies the following Equation 7.

$$q = \lfloor \bar{q}+1/2 \rfloor + v \cdot (-1)^{\lfloor 2\bar{q} \rfloor},$$

$$\bar{q} = N_{ZC}^{RS} \cdot (u+1)/31$$ [Equation 7]

where the length $N_{ZC}^{RB}$ of the Zadoff-Chu sequence is given by the greatest prime number to satisfy $N_{ZC}^{RS} < M_{sc}^{RS}$.

Base sequences of length less than $3N_{sc}^{RB}$ may be defined as follows. First of all, for $M_{sc}^{RS}=N_{sc}^{RB}$ and $M_{sc}^{RS}=2N_{sc}^{RB}$, the base sequences are given by the following Equation 8.

$$\bar{r}_{u,v}(n) = e^{j\varphi(n)\pi/4}, 0 \le n \le M_{sc}^{RS}-1$$ [equation 8]

where a value of $\varphi(n)$ for $M_{sc}^{RS}=N_{sc}^{RB}$ following Table 4. A value of $\varphi(n)$ for $m_{sc}^{rs}=2n_{sc}^{RB}$ is also given by a similar table.

TABLE 4

| u | $\varphi(0), \ldots, \varphi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

A reference signal for PUSCH is determined as follows.

A reference signal sequence $r^{PUSCH}(\cdot)$ for PUSCH is defined by $r^{PUSCH}(m \cdot M_{sc}^{RS}+n)=r_{u,v}^{(\alpha)}(n)$, wherein m and n satisfy m=0,1 and n=0, ..., $M_{sc}^{RS}-1$, and $M_{sc}^{RS}=M_{sc}^{PUSCH}$.

Cyclic shift in one slot is given by $a=2n_{cs}/12$ together with $n_{cs}=(n_{DMRS}^{(1)}+n_{DMRS}^{(2)}+n_{PRS}(n_s)) \mod 12$.

$n_{DMRS}^{(1)}$ is a broadcasted value, $N_{DMRS}^{(2)}$ is given by uplink scheduling allocation, and $n_{PRS}(n_s)$ is a cell-specific cyclic shift value. $n_{PRS}(n_s)$ varies depending on a slot number $n_s$, and is given by $n_{PRS}(n_s)=\Sigma_{i=0}^{7}c(8N_{symb}^{UL} \cdot n_s+i) \cdot 2^i$, c(i) is a pseudo-random sequence, and $c^{(i)}$ is a cell-specific value. A pseudo-random sequence generator may be reset to $$c_{init} = \left\lfloor \frac{N_{ID}^{cell}}{30} \right\rfloor \cdot 2^5 + f_{ss}^{PUSCH}$$

at the start of a radio frame.

Table 5 illustrates a cyclic shift field in a Downlink Control Information (DCI) format and $n_{DMRS}^{(2)}$.

TABLE 5

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

A physical mapping method for an uplink RS in PUSCH is as follows.

The sequence is multiplied by an amplitude scaling factor $\beta_{PUSCH}$ and mapped into the same set of physical resource blocks (PRBs) used for a corresponding PUSCH within a sequence starting with $r^{PUSCH}(0)$. The mapping into resource elements (k,l), with l=3 for normal cyclic prefix and l=2 for extended cyclic prefix, within the subframe is performed in such a manner that the order of k is increased and then a slot number is increased.

In summary, if length is $3N_{sc}^{RB}$ or more, a ZC sequence is used with cyclic extension and, if length is less than $3N_{sc}^{RB}$, a computer generated sequence is used. A cyclic shift is determined in accordance with a cell-specific cyclic shift, a UE-specific cyclic shift and a hopping pattern.

Figure 9:
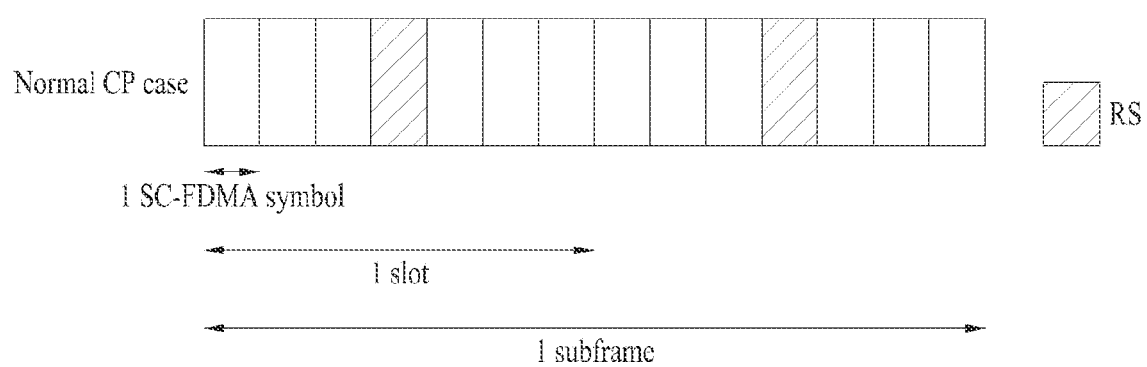
FIG. 9 illustrates a structure of a demodulation reference signal (DMRS) for a PUSCH.

FIG. 9 illustrates a structure of a demodulation reference signal (DMRS) for a PUSCH. Referring to FIG. 9, the DMRS is transmitted through fourth and eleventh SC-FDMA symbols.

Figure 10:
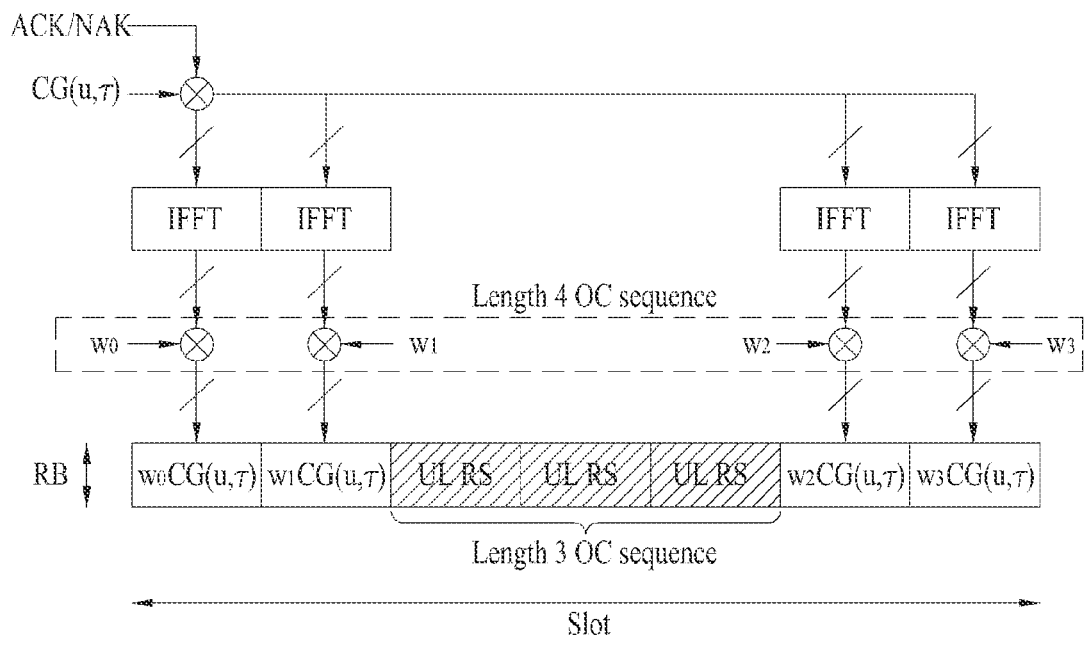
FIG. 10 illustrates a slot level structure of PUCCH formats 1a and 1b.

FIG. 10 illustrates PUCCH formats 1a and 1b in case of normal CP. The same control information is repeated on a slot basis in a subframe in PUCCH Format 1a and 1b. A UE transmits ACK/NACK signals through different resources that include different Cyclic Shifts (CSs) (frequency-domain code) of a Computer Generated-Constant Amplitude Zero Auto Correlation (CG-CAZAC) sequence and an Orthogonal Cover (OC) or Orthogonal Cover Code (OCC) (a time-domain spreading code). The OC includes, for example, a Walsh/DFT orthogonal code. If the number of CSs is 6 and the number of OCs is 3, a total of 18 UEs may be multiplexed in the same Physical Resource Block (PRB) based on a single antenna. OC sequences w0, w1, w2 and w3 are applicable to a random time domain (after FFT modulation) or to a random frequency domain (before FFT modulation). RS signal of each UE is also transmitted through different resources that include different cyclic shifts of a CG-CAZAC sequence and orthogonal cover codes w0, w1 and w2.

Length-4 and length-3 OCs for PUCCH Format 1/1a/1b are illustrated in Table 6 and Table 7 below.

TABLE 6

Length-4 orthogonal sequences for PUCCH formats 1/1a/1b

| Sequence index $n_{oc}$ ($n_s$) | Orthogonal sequences [w(0) ... w($N_{SF}^{PUCCH}$ − 1)] |
| --- | --- |
| 0 | [+1 +1 +1 +1] |
| 1 | [+1 −1 +1 −1] |
| 2 | [+1 −1 −1 +1] |

TABLE 7

Length-3 orthogonal sequences for PUCCH formats 1/1a/1b

| Sequence index $n_{oc}$ ($n_s$) | Orthogonal sequences [w(0) ... w($N_{SF}^{PUCCH}$ − 1)] |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Figure 11:
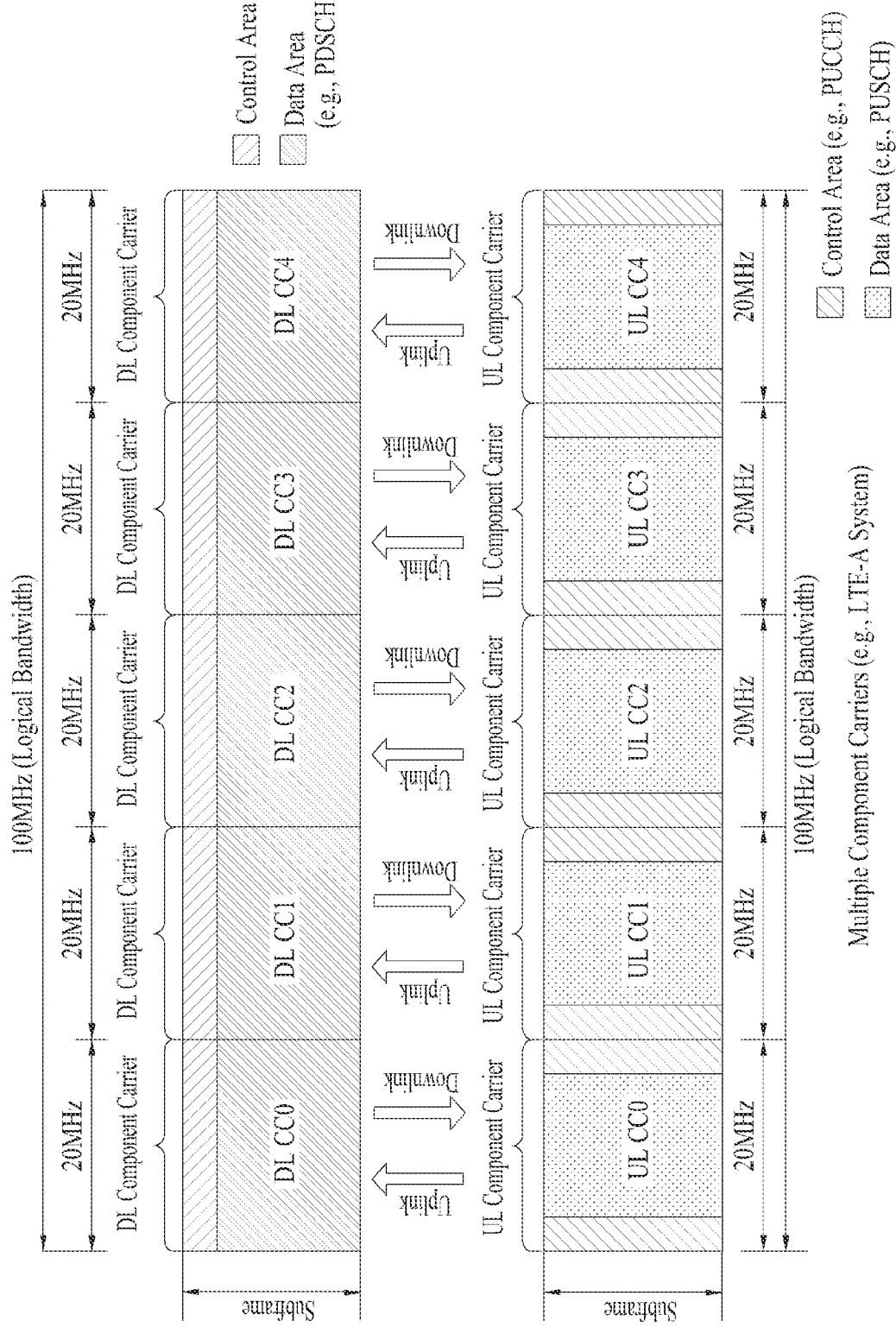
FIG. 11 illustrates a carrier aggregation (CA)-based wireless communication system.

FIG. 11 illustrates carrier aggregation (CA) communication system.

Referring to FIG. 11, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

■ CIF disabled: a PDCCH on a DL CC is used to allocate a PDSCH resource on the same DL CC or a PUSCH resource on a linked UL CC.
  ● No CIF
■ CIF enabled: a PDCCH on a DL CC can be used to allocate a PDSCH or PUSCH resource on a specific DL/UL CC from among a plurality of aggregated DL/UL CCs using the CIF.
  ● LTE DCI format extended to have CIF
    CIF corresponds to a fixed x-bit field (e.g. x=3) (when CIF is set)
    CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 12:
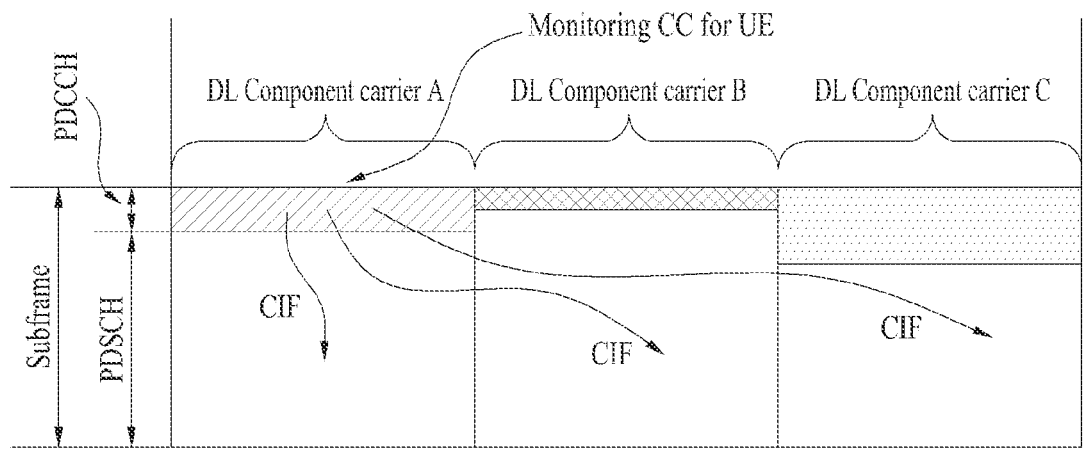
FIG. 12 illustrates cross-carrier scheduling.

FIG. 12 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 13:
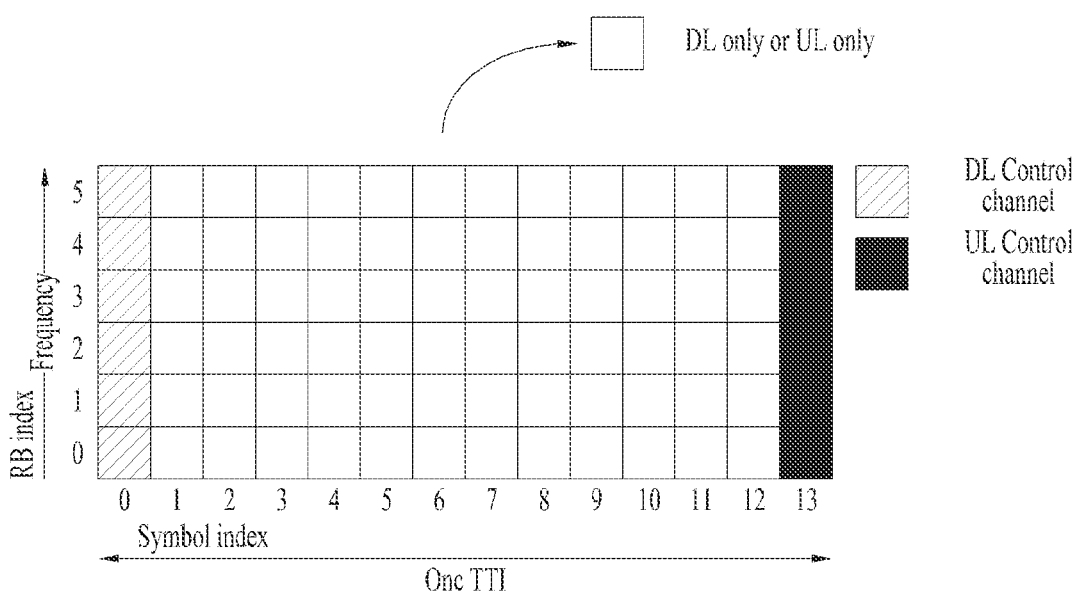
FIG. 13 illustrates a structure of a self-contained subframe.

In next-generation RAT (Radio Access Technology) a self-contained subframe is considered in order to minimize data transmission latency. FIG. 13 illustrates a self-contained subframe structure. In FIG. 13, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+ UL control period
DL control period+DL data period
DL control period+GP+UL data period+UL control period
DL control period+GP+UL data period A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Furthermore, in a millimeter wave (mmW) system, a wavelength of a signal is short, so that a multitude of antennas can be installed in the same area. For example, since the wavelength is 1 cm in a 30 GHz band, a total of 100 antenna elements can be installed in a 5-by-5 cm2 panel in a form of a two-dimensional array with a 0.5λ(wavelength) spacing. Therefore, in the mmW system, a plurality of antenna elements are used to increase a beamforming (BF) gain to increase a coverage or increase a throughput.

In this connection, when each antenna element has a TXRU (transceiver unit) so that transmission power and phase can be adjusted for each antenna element, independent beamforming may be realized for each frequency resource. However, installing each TXRU in each of all 100 antenna elements is ineffective in terms of cost. Therefore, a scheme of mapping a plurality of antenna elements to one TXRU and adjusting a direction of the beam with an analog phase shifter is considered. This analog beamforming scheme may form only one beam direction in a full band, and has a disadvantage that a frequency selective beam cannot be achieved. Thus, as an intermediate form between digital BF and analog BF, a hybrid BF in which B TXRUs map to Q antenna elements (B<Q) may be considered. In this case, a number of directions of a beam in which the beam is simultaneously transmitted is limited to a number smaller than or equal to B, though it varies depending on a connection scheme between the B TXRUs and Q antenna elements.

Figure 14:
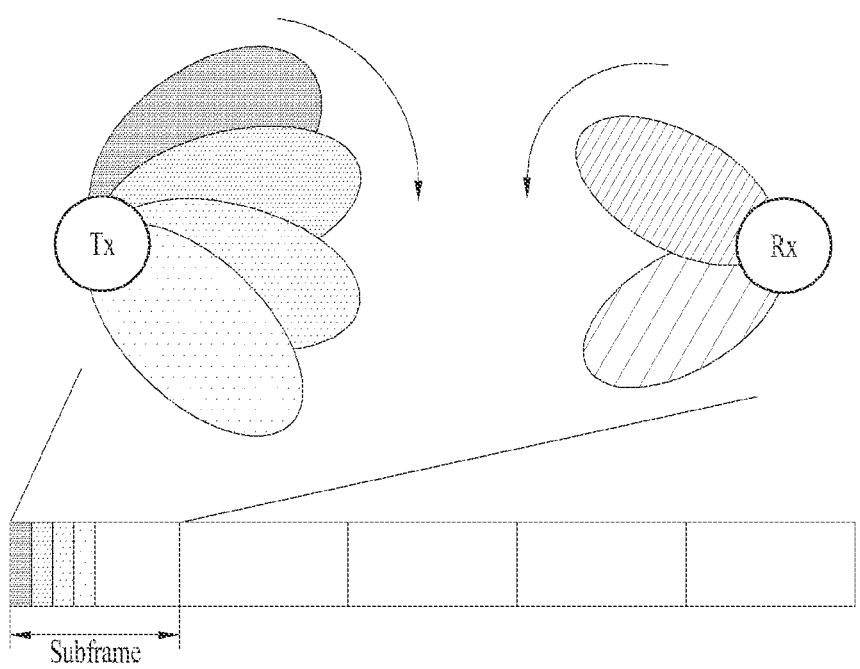
FIG. 14 illustrates analog beamforming.

FIG. 14 illustrates analog beamforming. Referring to FIG. 14, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time.

Embodiment

As described before, the new RAT system is highly likely to be implemented in such a manner that an eNB and a UE perform transmission/reception (Tx/Rx) (analog or hybrid) beamforming based on mmW properties. A plurality of beam directions (e.g., represented by beam IDs/indexes or port IDs/indexes) may be available to the eNB and the UE, and the best Tx/Rx beam (hereinafter, referred to as a serving beam) among beams may be changed over time due to a radio channel environment and the mobility of the UE. Accordingly, a Tx/Rx beam alignment procedure for updating a serving beam may be performed according to a specific period or upon occurrence of an event (e.g., when reception performance is decreased to or below a predetermined level) in a multi-beam operation situation. For the convenience, an RS used for beam alignment is referred to as a beam refinement RS (BRRS).

The present disclosure proposes a data scheduling method and a signal processing/handling method in a Tx/Rx beam alignment situation. For the convenience, a time unit for data scheduling is defined as a slot. The term slot may be replaced with transmission time interval (TTI), subframe, and so on. To help the understanding of the present disclosure, it is assumed that an SRS is used as a BRRS (referred to as a UL BRRS) in a UL Tx/Rx beam alignment procedure, whereas a CSI-RS is used as a BRRS (referred to as a DL BRRS) in a DL Tx/Rx beam alignment procedure. Accordingly, a transmission end and a reception end for the UL BRRS may be described as a UE Tx beam and an eNB Rx beam, respectively. Likewise, a transmission end and a reception end for the DL BRRS may be described as an eNB Tx beam and a UE eNB Rx beam, respectively. Further, the term Tx/Rx beam (direction) may be used interchangeably with its equivalent terms Tx/Rx beam ID (or index) or Tx/Rx port ID (or index). In the following description, puncturing may include rate-matching. The puncturing includes, but not limited to, generating modulation symbols according to the amount of allocated Tx resources (e.g., RBs or Res) and dropping some data symbol(s) according to the amount of actual available Tx resources. The rate-matching includes generating data modulation symbols according to the amount of actual available Tx resources.

■ UL Beam Alignment and UL Data Scheduling

The following may be considered as SRS (i.e., UL BRRS) transmission-based UL Tx/Rx beam alignment procedures. In each option, a UL data scheduling method and a UE operation method are proposed. The present disclosure is based on the assumption that a time unit for UL data scheduling is a slot and thus a UE Tx beam (direction) and an eNB Rx beam (direction) for UL data are allocated/configured on a slot basis (that is, the same allocation/configuration is applied throughout a slot).

(1) Option 1

A. Tx/Rx beam alignment method i. An SRS is transmitted in a plurality of symbols (all symbols or the remaining symbols except for a specific small number of symbols) in a slot. A symbol includes an OFDM(A) symbol or SC-FDM(A) symbol.

ii. A UE Tx beam (direction) is changed one or more times in a slot or changed in each symbol (group) (in the slot). A symbol group includes one or more consecutive symbols.

iii. An eNB Rx beam (direction) is changed on a slot basis (fixed within a slot).

iv. An SRS transmitted in the above manner is referred to as a "beam-sweep SRS".

B. UL Data Scheduling and UE Operation i. Alt 1: Case in which simultaneous transmission of a beam-sweep SRS and UL data (e.g., a PUSCH) (multiplexed with the SRS in FDM) in the same slot is not allowed/supported for a UE.

1. If a beam-sweep SRS and UL data are simultaneously scheduled/indicated (for transmission in the same slot), the UE may transmit only the beam-sweep SRS, while dropping the UL data transmission). Herein, it does not matter whether resources (e.g., REs) allocated to the beam-sweep SRS and the UL data overlap with each other. If the beam-sweep SRS is transmitted only during a partial period in the slot, the UE may transmit the UL data during a time period without the beam-sweep SRS (through puncturing/rate matching). Since HARQ is applied to the UL data, transmission of UL data may be favorable even though it is partial. A UE Tx beam (direction) configured for UL data transmission may be applied to the UL data. However, if the length (e.g., in symbols) of a time period during which the UL data is transmittable is equal to or less than a specific value (e.g., 3 symbols) or a DMRS is not included in the time period during which the UL data is transmittable, the whole UL data transmission may be dropped.

2. The same operation principle may be applied to beam-sweep SRS transmission and UL control transmission (e.g., a PUCCH) (transmitted in FDM with a corresponding SRS). In this case, since the PUCCH has a higher protection priority than the SRS, only the PUCCH may be transmitted, while the SRS is dropped, or one of the two may be dropped, with the other transmitted according to the type of UCI delivered on the PUCCH. For example, if the UCI type is HARQ-ACK or SR, only the PUCCH is transmitted while the SRS is dropped. On the other hand, if the UCI type is CSI, only the SRS is transmitted while the PUCCH is dropped.

In regard to beam-sweep SRS transmission and UL data (e.g., PUSCH) transmission (in FDM with a corresponding SRS), one of the two may be dropped with the other transmitted according to whether UL data and UCI are multiplexed in the PUSCH. For example, if there is no UCI multiplexed with UL data in the PUSCH, only the SRS may be transmitted while the PUSCH may be dropped. On the other hand, if UL data is multiplexed with UCI in the PUSCH, only the PUSCH may be transmitted while the SRS may be dropped. Or one of the two may be dropped with the other transmitted according to the type of the UCI multiplexed with the UL data. For example, if the UCI type is HARQ-ACK, only the PUSCH may be transmitted while the SRS may be dropped. On the other hand, if the UCI type is CSI, only the SRS may be transmitted while the PUSCH may be dropped.

ii. Alt 2: Case in which simultaneous transmission of a beam-sweep SRS and UL data (e.g., a PUSCH) (multiplexed with the SRS in FDM) in the same slot is allowed/supported for a UE.

1. Since a UE Tx beam (direction) for beam-sweep SRS transmission is changed on a symbol (symbol group) basis, the UE may map/transmit a DMRS to/in each of the symbols (symbol groups) of a UL data channel.

2. A beam-sweep SRS and a UL data signal which are mapped to the same symbol (symbol group) may be transmitted based on the same UE Tx beam (direction) (e.g., configured for transmission of the SRS). That is, the UL data may be transmitted by applying the same UE Tx beam (direction) as configured for the SRS transmission to the UL data transmission, and a DMRS for the UL data may be transmitted additionally each time the UE Tx beam (direction) configured for the SRS transmission is changed. It does not matter whether resources (e.g., REs) allocated to the beam-sweep SRS and the UL data overlap with each other. When the beam-sweep SRS is transmitted only during a partial period in a slot, the UE may transmit the UL data during a time period without the beam-sweep SRS in the slot according to an original configuration (e.g., a Tx beam (direction) configured for the UL data, DMRS mapping, and so on).

iii. For beam alignment across a plurality of slots, a plurality of slots allocated as beam-sweep SRS transmission resources may be configured non-contiguously (with a specific period).

(2) Option 2

A. Tx/Rx Beam Alignment Method i. An SRS is transmitted in a plurality of symbols (all symbols or the remaining symbols except for a specific small number of symbols) in a slot. A symbol includes an OFDM(A) symbol or SC-FDM(A) symbol.

ii. A UE Tx beam (direction) is changed on a slot basis (fixed within a slot).

iii. An eNB Rx beam (direction) is changed one or more times within a slot or changed on a symbol (symbol group) basis (within the slot). A symbol group includes one or more consecutive symbols.

iv. An SRS transmitted in the above manner is referred to as a "beam-repeat SRS".

B. UL Data Scheduling and UE Operation i. Since UE Tx beams (directions) of both of a beam-repeat SRS and UL data are changed on a slot basis, simultaneous transmission of the beam-repeat SRS and the UL data (e.g., a PUSCH) (multiplexed with the SRS in FDM) may be allowed/supported for a UE.

1. The above operation may be limited to a case in which the same UE Tx beam (direction) is indicated for the beam-repeat SRS transmission and the UL data transmission. If resources (e.g., REs) allocated to the two UL signals overlap with each other, the UE may perform the SRS transmission, while for the UL data, the UE may a) map/transmit no signal to/in the overlapped resources (by puncturing) or b) drop the whole UL data transmission.

2. If different UE Tx beams (beam directions) are indicated for transmission of a beam-repeat SRS and transmission of UL data, the UE may transmit only the SRS, while dropping the UL data transmission.

3. If different Tx beams (beam directions) are indicated for transmission of a beam-repeat SRS and transmission of UL data, the UE may transmit both of the beam-repeat SRS and the UL data (e.g., PUSCH) (multiplexed with the SRS in FDM) in the same slot by applying the same single Tx beam (direction) as configured for the SRS transmission to the UL data transmission. When the beam-repeat SRS is transmitted only during a partial time period in a slot, the UE may apply an original UE Tx beam (direction) indicated for the UL data during a time period without the beam-repeated SRS in the slot, and a UE Tx beam (direction) configured for the SRS transmission during a time period with the beam-repeated SRS. However, if there is a time period with a DMRS in the time period to which the original UE Tx beam (direction) indicated for the UL data is applied and the time period to which the UE Tx beam (direction) configured for the SRS transmission is applied, the UE may a) map/transmit no signal (by puncturing) or b) additionally map/transmit a DMRS, for the UL data in the time period.

ii. For beam alignment across a plurality of slots, a plurality of slots allocated as beam-repeat SRS transmission resources may be configured non-contiguously (with a specific period).

(3) Option 3

A. Tx/Rx Beam Alignment Method i. An SRS is transmitted in a plurality of symbols (all symbols or the remaining symbols except for a specific small number of symbols) in a slot. A symbol includes an OFDM(A) symbol or SC-FDM(A) symbol, and a symbol group includes one or more consecutive symbols.

ii. Case in which the number of SRS transmission symbols (symbol groups) in a single slot is 1 or larger.

1. Case 1: A UE Tx beam (direction) is changed one or more times within a slot or changed on a symbol (symbol group) basis (in the slot), and an eNB Rx beam (direction) is changed on a slot basis (fixed within a slot).

2. Case 2: A UE Tx beam (direction) is changed on a slot basis (fixed within a slot), and an eNB Rx beam (direction) is changed one or more times within a slot or changed on a symbol (symbol group) basis (in a slot).

iii. An SRS transmitted in the above manner is referred to as a "single-beam SRS".

B. UL Data Scheduling and UE Operation i. Simultaneous transmission of a single-beam SRS and UL data (e.g., a PUSCH) within the same slot may be allowed/supported for one UE.

1. Case 1: If the same Tx beam (direction) is indicated for transmission of a single-beam SRS and transmission of UL data, without overlap between resources (REs) of the two UL signals, the UE may transmit the two UL signals (simultaneously). If the resources (REs) of the two UL signals overlap with each other, the UE may a) map/transmit no signal only in the overlapped resources (or only in SRS transmission symbols) (by puncturing), for the UL data, while transmitting the SRS, or b) transmit the UL data, while dropping the SRS transmission.

2. Case 2: If different UE Tx beams (beam directions) are indicated for transmission of a single-beam SRS and transmission of UL data, the UE may a) map/transmit no signal only in SRS transmission symbols (by puncturing), for the UL data, while transmitting the SRS, or b) transmit the UL data, while dropping the SRS transmission. Further, c) the UE may transmit both of the single-beam SRS and the UL data (e.g., a PUSCH) (multiplexed with the SRS in FDM) in the same slot by applying the same UE Tx beam as configured for the SRS transmission to the transmission of the UL data only in the SRS transmission symbols. In the case of c), an original UE Tx beam (direction) indicated for the UL data may be applied to the transmission of the UL data in symbols carrying no SRS.

3. Case 3: If the number of SRS transmission symbols (symbol groups) is 1 or larger in a single slot, the UE may apply the operation described in Case ½ a) on an SRS symbol (group) basis or b) commonly to all SRS symbols (symbol groups).

ii. For beam alignment across a plurality of slots, a plurality of slots allocated as single-beam SRS transmission resources may be configured contiguously, or non-contiguously (with a specific period). A time interval between adjacent allocated slots (i.e., an allocation slot period) may be set to be smaller in Option 3 than in Option ½.

(4) Related Issues

A. In the beam alignment procedures (particularly, in Option ½), whether simultaneous transmission of a UL BRRS (e.g., beam-sweep SRS or beam-repeat SRS) and UL data in the same slot is allowed/supported for a UE may be configured/signaled to the UE (by the eNB).

i. For example, whether simultaneous transmission of a beam-sweep or beam-repeat SRS and UL data in the same slot is available or UL data transmission is unavailable in a slot configured with transmission of a beam-sweep or beam-repeat SRS may be configured/signaled.

B. UE Tx beams (beam directions) may be determined as follows for application to transmission of UL data and transmission of a UL BRRS (e.g., beam-sweep SRS, beam-repeat SRS, or single-beam SRS). The following methods may be used in combination under circumstances.

i. Alt 1: A UE Tx beam (direction) may be indicated individually for each of UL data and an SRS. For example, the UE Tx beam (direction) of the UL data may be indicated by Layer 1 (L1) signaling (e.g., a PDCCH). Further, the UE Tx beam (direction) of the SRS may be predefined according to a symbol (group)/slot index or signaled by higher-layer signaling (e.g., RRC signaling).

ii. Alt 2: The same UE Tx beam (direction) as indicated for UL data transmission may be applied to transmission of an SRS.

iii. Alt 3: It may be assumed that the same UE Tx beam (direction) is applied to transmission of two UL signals (particularly, in Option ⅔). For example, the same UE Tx beam (direction) as configured for SRS transmission may be applied to UL data transmission.

Figure 15:
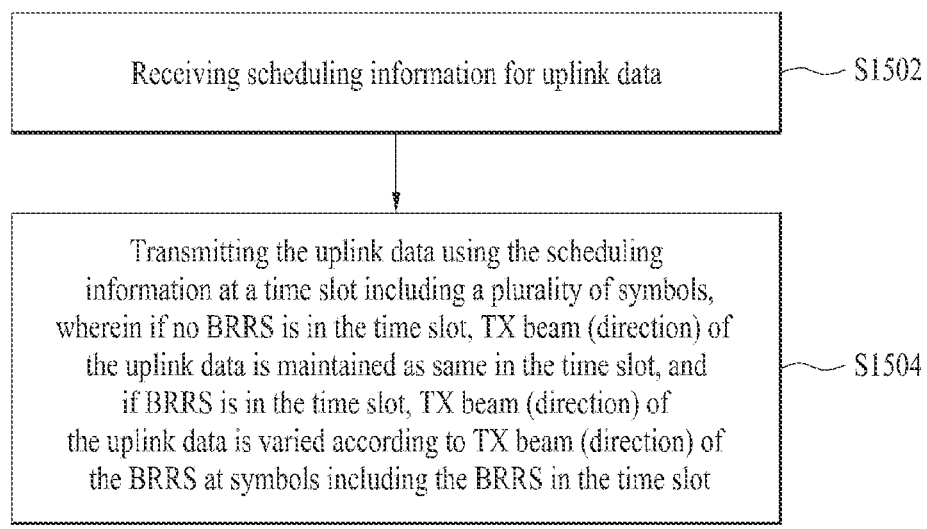
FIG. 15 illustrates signal transmission procedure according to the present disclosure.

FIG. 15 illustrates an exemplary signal transmission procedure according to the present disclosure. The above methods may be used in combination for signal transmission of a UE.

Referring to FIG. 15, after receiving scheduling information for UL data (S1502), a UE may transmit the UL data in a time slot including a plurality of symbols, using the scheduling information (S1504). If an RS for beam alignment is not transmitted in the time slot, a Tx beam direction for the UL data may be maintained the same throughout the time slot. On the contrary, if the RS for beam alignment is transmitted in the time slot, the Tx beam direction of the UL data may be changed to match a Tx beam direction of the RS for beam alignment in a symbol carrying the RS for beam alignment. An original Tx beam direction configured for the UL data may be different from the Tx beam direction of the RS for beam alignment. If the Tx beam direction of the UL data is changed to match the Tx beam direction of the RS for beam alignment, an RS for demodulation of the UL data may be transmitted additionally in one or more symbols carrying the RS for beam alignment. Further, in the time slot, the Tx beam direction of the RS for beam alignment may be changed on a symbol group basis, and the Tx beam direction of the UL data may also be changed on a symbol group basis to match the Tx beam direction of the RS for beam alignment. Further, the wireless communication system may include a $3^{rd}$ generation partnership project (3GPP)-based wireless communication system.

■ DL Beam Alignment and DL Data Scheduling

The following may be considered aa CSI-RS (i.e., DL BRRS) transmission-based DL Tx/Rx beam alignment procedures. In each option, a DL data scheduling method and a UE operation method are proposed. The present disclosure is based on the assumption that a time unit for DL data scheduling is a slot and thus an eNB Tx beam (direction) and a UE Rx beam (direction) for DL data are allocated/configured on a slot basis (that is, the same allocation/configuration is applied throughout a slot).

(1) Option 1

A. A Tx/Rx Beam Alignment Method i. A CSI-RS is transmitted in a plurality of symbols (all symbols or the remaining symbols except for a specific small number of symbols) in a slot. A symbol includes an OFDM(A) symbol.

ii. A UE Rx beam (direction) is changed one or more times in a slot or changed on a symbol (symbol group) basis (in the slot). A symbol group includes one or more consecutive symbols.

iii. An eNB Tx beam (direction) is changed on a slot basis (fixed within a slot).

iv. A CSI-RS transmitted in the above manner is referred to as a "beam-sweep CSI-RS".

B. DL Data Scheduling and UE Operation i. Alt 1: Case in which simultaneous transmission of a beam-sweep CSI-RS and DL data (e.g., a PDSCH) (multiplexed with the CSI-RS in FDM) in the same slot is not allowed/supported for a UE.

1. A beam-sweep CSI-RS and DL data (multiplexed with the CSI-RS in FDM) are simultaneously scheduled/indicated (for transmission in the same slot), the UE may receive only the beam-sweep CSI-RS, while dropping the DL data reception. Herein, it does not matter whether resources (e.g., REs) allocated to the beam-sweep CSI-RS and the DL data overlap with each other. If the beam-sweep CSI-RS is transmitted only during a partial time period in a slot, the UE may receive the DL data during a time period without the beam-sweep CSI-RS (through puncturing/rate matching) in the slot. Since HARQ is applied to the DL data, reception of DL data may be favorable even though it is partial. A UE Rx beam (direction) configured for DL data transmission may be applied to the DL data. However, if the length (e.g., in symbols) of a time period during which the DL data is transmittable is equal to or less than a specific value (e.g., 3 symbols) or a DMRS is not included in the time period during which the DL data is transmittable, the whole DL data reception may be dropped.

2. For the above-described (and later-described) dropped DL data, the UE may a) map and transmit an HARQ-ACK feedback as NACK or b) drop the HARQ-ACK transmission.

ii. Alt 2: Case in which simultaneous transmission of a beam-sweep CSI-RS and DL data (multiplexed with the CSI-RS in FDM) in the same slot is allowed/supported for a UE.

1. Since a UE Rx beam (direction) for beam-sweep CSI-RS reception is changed on a symbol (symbol group) basis, a DMRS may be mapped to and transmitted in each of the symbols (symbol groups) of a DL data channel.

2. A beam-sweep CSI-RS and a DL data signal which are mapped to the same symbol (symbol group) may be transmitted based on the same UE Rx beam (direction) (e.g., configured for transmission of the CSI-RS). That is, the DL data may be transmitted by applying the same UE Rx beam (direction) as configured for the CSI-RS transmission to the DL data transmission, and a DMRS for the DL data may be transmitted additionally each time the UE Rx beam (direction) configured for the CSI-RS transmission is changed. It does not matter whether resources (e.g., REs) allocated to the beam-sweep CSI-RS and the DL data overlap with each other. When the beam-sweep CSI-RS is received only during a partial time period in a slot, the UE may receive the DL data according to an original configuration (e.g., an Rx beam (direction) configured for the DL data, DMRS mapping, and so on) during a time period without the beam-sweep CSI-RS in the slot.

iii. For beam alignment across a plurality of slots, a plurality of slots allocated as beam-sweep CSI-RS transmission resources may be configured non-contiguously with a specific period).

(2) Option 2

A. Tx/Rx Beam Alignment Method i. A CSI-RS is transmitted in a plurality of symbols (all symbols or the remaining symbols except for a specific small number of symbols) in a slot. A symbol includes an OFDM(A) symbol.

ii. A UE Rx beam (direction) is changed on a slot basis (fixed within a slot).

iii. An eNB Tx beam (direction) is changed one or more times in a slot or changed on a symbol (group) basis (in the slot). A symbol group includes one or more consecutive symbols.

iv. A CSI-RS transmitted in the above manner is referred to as a "beam-repeat CSI-RS".

B. DL Data Scheduling and UE Operation i. Since UE Rx beams (beam directions) of both a beam-repeat CSI-RS and DL data are changed on a slot basis, simultaneous transmission of the beam-repeat CSI-RS and the DL data (e.g., a PDSCH) (multiplexed with the CSI-RS in FDM) may be allowed/supported for a UE.

1. The above operation may be limited to a case in which the same Rx beam (direction) is indicated for the beam-repeat CSI-RS transmission and the DL data transmission. If resources (e.g., REs) allocated to the two DL signals overlap with each other, the UE may perform the CSI-RS reception, while for the DL data, the UE may a) map/receive no signal only to/in the overlapped resources (by puncturing) or b) drop the whole DL data reception.

2. If different UE Rx beams (beam directions) are indicated for transmission of a beam-repeat CSI-RS and transmission of DL data, the UE may receive only the CSI-RS, while dropping the DL data reception.

3. If different UE Rx beams (beam directions) are indicated for reception of a beam-repeat CSI-RS and transmission of DL data, the UE may receive both of the beam-repeat CSI-RS and the DL data (e.g., a PDSCH) (transmitted with the CSI-RS in FDM) in the same slot by applying the same UE Rx beam (direction) as configured for the CSI-RS reception to the DL data reception. When the beam-repeat CSI-RS is received only during a partial time period in a slot, the UE may apply an original UE Rx beam (direction) indicated for the DL data during a time period without the beam-repeated CSI-RS in the slot, and a UE Rx beam (direction) configured for the CSI-RS transmission during a time period with the beam-repeated CSI-RS. However, if there is a time period with a DMRS in the time period to which the original UE Tx beam (direction) indicated for the UL data is applied and the time period to which the UE Tx beam (direction) configured for the CSI-RS transmission is applied, the eNB may a) map/transmit no signal (by puncturing) or b) additionally map/transmit a DMRS, for the DL data in the time period.

ii. For beam alignment across a plurality of slots, a plurality of slots allocated as beam-repeat CSI-RS transmission resources may be configured non-contiguously (with a specific period).

(3) Option 3

A. Tx/Rx Beam Alignment Method i. A CSI-RS is transmitted in a plurality of symbols (all symbols or the remaining symbols except for a specific small number of symbols) in a slot. A symbol includes an OFDM(A) symbol, and a symbol group includes one or more consecutive symbols.

ii. Case in which the number of CSI-RS transmission symbols (symbol groups) in a single slot is 1 or larger.

1. Case 1: A UE Rx beam (direction) is changed one or more times in a slot or changed on a symbol (symbol group) basis (in the slot), and an eNB Tx beam (direction) is changed on a slot basis (fixed within a slot).

2. Case 2: A UE Rx beam (direction) is changed on a slot basis (fixed within a slot), and an eNB Tx beam (direction) is changed one or more times in a slot or on a symbol (symbol group) basis (in the slot).

iii. A CSI-RS transmitted in the above manner is referred to as a "single-beam CSI-RS".

B. DL Data Scheduling and UE Operation i. Simultaneous transmission of a single-beam CSI-RS and DL data (e.g., a PDSCH) in the same slot may be allowed/supported for one UE.

1. Case 1: If the same UE Rx beam (direction) is indicated for transmission of a single-beam CSI-RS and transmission of DL data, without overlap between resources (REs) of the two DL signals, the UE may receive the two DL signals (simultaneously). If the resources (REs) of the two DL signals overlap with each other, the UE may a) map/transmit no signal only in the overlapped resources (or only in CSI-RS transmission symbols) (by puncturing), for the DL data, while receiving the CSI-RS, or b) receive the DL data, while dropping the CSI-RS reception.

2. Case 2: If different UE Rx beams (beam directions) are indicated for transmission of a single-beam CSI-RS and transmission of DL data, the UE may a) map/receive no signal only in CSI-RS transmission symbols (by puncturing), for the DL data, while receiving the CSI-RS, or b) receive the DL data, while dropping the CSI-RS reception. Further, c) the UE may receive both of the single-beam CSI-RS and the DL data (e.g., PDSCH) (transmitted with the CSI-RS in FDM) in the same slot by applying the same UE Rx beam as configured for the CSI-RS transmission to the reception of the DL data only in the CSI-RS transmission symbols. In the case of c), an original UE Rx beam (direction) indicated for the DL data may be applied to the reception of the DL data in symbols carrying no CSI-RS.

3. Case 3: If the number of CSI-RS transmission symbols (symbol groups) in a single slot is 1 or larger, the UE may apply the operation described in Case ½ a) on a CSI-RS symbol (group) basis or b) commonly to all CSI-RS symbols (symbol groups).

ii. For beam alignment across a plurality of slots, a plurality of slots allocated as single-beam CSI-RS transmission resources may be configured contiguously, or non-contiguously (with a specific period). A time interval between adjacent allocated slots (i.e., an allocation slot period) may be set to be smaller in Option 3 than in Option ½.

(4) Related Issues

A. In the beam alignment procedures (particularly, in Option ½), whether simultaneous reception of a DL BRRS (e.g., beam-sweep CSI-RS or beam-repeat CSI-RS) and DL data in the same slot is allowed/supported for a UE may be configured/signaled to the UE (by the eNB).

i. For example, whether simultaneous reception of a beam-sweep or a beam-repeat CSI-RS and DL data in the same slot is available or DL data reception is unavailable in a slot configured with transmission of a beam-sweep or beam-repeat CSI-RS may be configured/signaled.

B. A UE Rx beam (direction) (and/or an eNB Tx beam (direction)) may be determined as follows for application to transmission of DL data and transmission of a DL BRRS (e.g., beam-sweep CSI-RS, beam-repeat CSI-RS, or single-beam CSI-RS). The following methods may be used in combination under circumstances.

i. Alt 1: A UE Rx beam (direction) (and/or an eNB Tx beam (direction)) may be indicated individually for each of DL data and a CSI-RS. For example, a UE Rx beam (direction) for DL data may be indicated by Layer 1 (L1) signaling (e.g., a PDCCH). Further, a UE Rx beam (direction) (and/or an eNB Tx beam (direction)) for a CSI-RS may be predefined according to a symbol (group)/slot index or signaled by higher-layer signaling (e.g., RRC signaling).

ii. Alt 2: The same UE Rx beam (direction) (and/or an eNB Tx beam (direction)) as indicated for DL data transmission may be applied to transmission of a CSI-RS.

iii. Alt 3: It may be assumed that the same UE Rx beam (direction) (and/or the same eNB Tx beam (direction)) is applied to transmission of two DL signals (particularly, in Option ⅔). For example, the same UE Rx beam (direction) (and/or the same eNB Tx beam (direction)) configured for CSI-RS transmission may be applied to DL data reception.

The UE operation methods (signal processing and handling methods) proposed in the present disclosure are not limited to a UL/DL BRRS transmission situation configured for the purpose of UL/DL beam alignment. The same operation principle of the proposed methods may also be applied to transmission of a UL SRS and a DL CSI-RS which are configured in a normal situation (e.g., similarly to Option ⅔).

Figure 16:
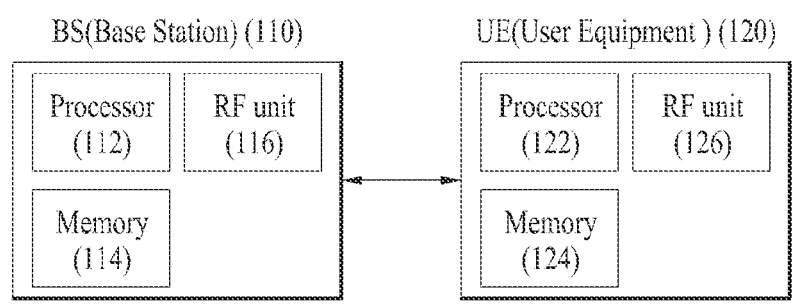
FIG. 16 illustrates a base station and a user equipment applicable to an embodiment of the present disclosure.

FIG. 16 illustrates a BS and a UE of a wireless communication system, which are applicable to embodiments of the present disclosure.

Referring to FIG. 16, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

What is claimed is:

1. A method of receiving a downlink signal by a user equipment in a wireless communication system, the method comprising:
    receiving downlink control information (DCI) which schedules physical downlink shared channel (PDSCH) in a slot; and
    performing measurements on a channel state information reference signal (CSI-RS) resource for beam alignment detection,
    wherein based on the CSI-RS resource being transmitted with a same downlink transmission beam direction within plural symbols of the CSI-RS resource in the slot, the PDSCH is not received in the plural symbols.

2. The method according to claim 1, wherein the CSI-RS resource is configured to occur with a periodicity of multiple slots.

3. The method according to claim 1, further comprising:
    based on the PDSCH being not received in the plural symbols in the slot, transmitting negative acknowledgement (NACK) for the PDSCH.

4. The method according to claim 1, further comprising:
    based on the PDSCH being not received in the plural symbols in the slot, dropping a hybrid automatic repeat request acknowledgement (HARQ-ACK) feedback for the PDSCH.

5. The method according to claim 1, wherein frequency resources assigned to the CSI-RS resource and the PDSCH are different.

6. A method of transmitting a downlink signal by a base station in a wireless communication system, the method comprising:
    transmitting configuration information regarding a channel state information reference signal (CSI-RS) resource for beam alignment detection; and
    transmitting downlink control information (DCI) which schedules physical downlink shared channel (PDSCH) in a slot,
    wherein based on the CSI-RS resource being transmitted with a same downlink transmission beam direction within plural symbols of the CSI-RS resource in the slot, the PDSCH is not transmitted in the plural symbols.

7. The method according to claim 6, wherein the CSI-RS resource is configured to occur with a periodicity of multiple slots.

8. The method according to claim 6, further comprising:
    based on the PDSCH being not transmitted in the plural symbols in the slot, receiving negative acknowledgement (NACK) for the PDSCH.

9. The method according to claim 6, further comprising:
    based on the PDSCH being not transmitted in the plural symbols in the slot, dropping reception of a hybrid automatic repeat request acknowledgement (HARQ-ACK) feedback for the PDSCH.

10. The method according to claim 6, wherein frequency resources assigned to the CSI-RS resource and the PDSCH are different.

* * * * *